United States Patent [19]
McLaughlin et al.

[11] Patent Number: 5,657,958
[45] Date of Patent: Aug. 19, 1997

[54] SEAT POST ASSEMBLY

[75] Inventors: Ronald J. McLaughlin, Maumee; Kevin J. Jaworski, Norwalk, both of Ohio

[73] Assignee: Monroe Clevite Elastomers Division of The Pullman Company, Milan, Ohio

[21] Appl. No.: 395,664

[22] Filed: Feb. 28, 1995

[51] Int. Cl.$^6$ .................................................. B62M 1/00
[52] U.S. Cl. .................. 248/632; 188/132; 248/188.5; 248/631; 280/220; 280/283
[58] Field of Search ..................... 248/632, 581, 248/188.5, 631; 188/131, 132; 403/365, 372, 225, 228; 280/220, 283, 274, 275, 279

[56] References Cited

U.S. PATENT DOCUMENTS

| | | | |
|---|---|---|---|
| 2,587,121 | 2/1952 | Deardorff et al. | 267/132 X |
| 3,241,858 | 3/1966 | Duffy | 280/276 |
| 3,292,956 | 12/1966 | Schiansky | 248/188.5 X |
| 3,771,827 | 11/1973 | Winfree . | |
| 3,936,076 | 2/1976 | Probst | 280/276 |
| 4,067,525 | 1/1978 | Allen | 248/632 |
| 4,068,858 | 1/1978 | Harrison et al. | 280/279 X |
| 4,603,598 | 8/1986 | Tsuji et al. | 403/225 X |
| 4,647,245 | 3/1987 | Konsevich | 248/632 X |
| 4,768,393 | 9/1988 | Beaman | 403/225 X |
| 4,830,324 | 5/1989 | Neville | 248/188.5 X |
| 4,997,232 | 3/1991 | Johnsen . | |
| 5,003,839 | 4/1991 | Yang | 280/279 X |
| 5,044,648 | 9/1991 | Knapp . | |
| 5,062,617 | 11/1991 | Campbell . | |
| 5,094,424 | 3/1992 | Hartway . | |
| 5,236,169 | 8/1993 | Johnsen . | |
| 5,287,354 | 2/1994 | McWethy | 280/284 |
| 5,308,140 | 5/1994 | Yu . | |
| 5,324,058 | 6/1994 | Massaro . | |
| 5,328,160 | 7/1994 | Mclaughlin | 267/141.3 |
| 5,382,038 | 1/1995 | Allsop et al. . | |
| 5,382,039 | 1/1995 | Hawker | 280/283 |
| 5,438,939 | 8/1995 | Clarke | 248/188.5 |

FOREIGN PATENT DOCUMENTS

| | | | |
|---|---|---|---|
| 578747 | 6/1933 | Germany | 248/188.5 |

OTHER PUBLICATIONS

Trade Journal Article, Winter 1994/1995, vol. 3, No. 1, "Tamer ShackPosts—Santana Introduces Break Through in Rider Comfort," 1994.

*Primary Examiner*—Leslie A. Braun
*Assistant Examiner*—Derek J. Berger
*Attorney, Agent, or Firm*—Harness, Dickey & Pierce

[57] ABSTRACT

A seat post assembly attaching a seat to a bicycle is provided. The assembly includes an elastomeric shock absorbing subassembly bonded to a curved bar which is received in a tube of the bicycle at one end and attaches to a seat at the other. The subassembly is also retained on the inside of the tube.

11 Claims, 4 Drawing Sheets

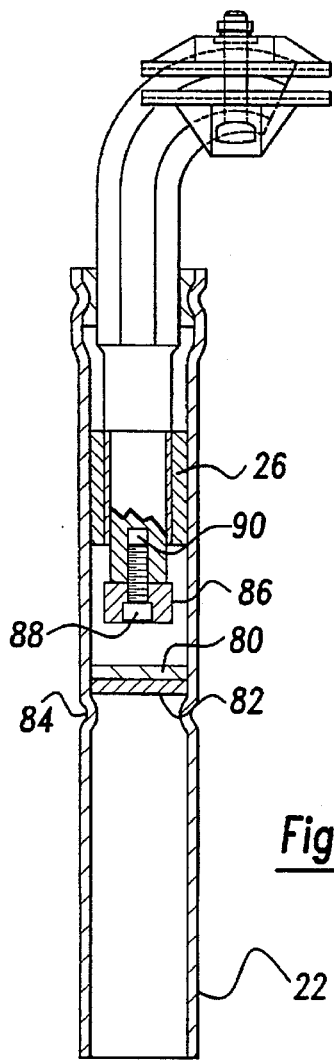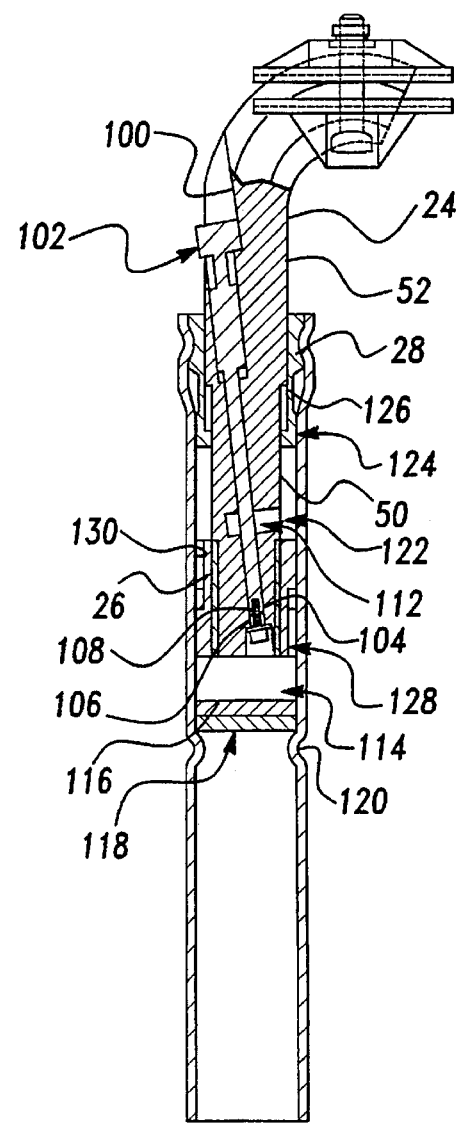

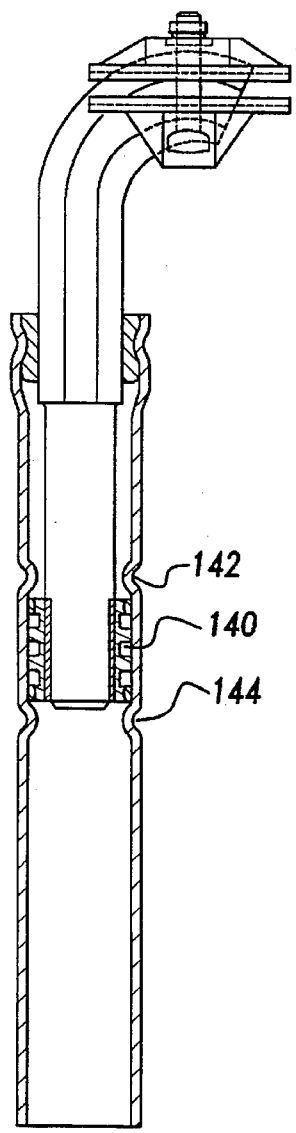
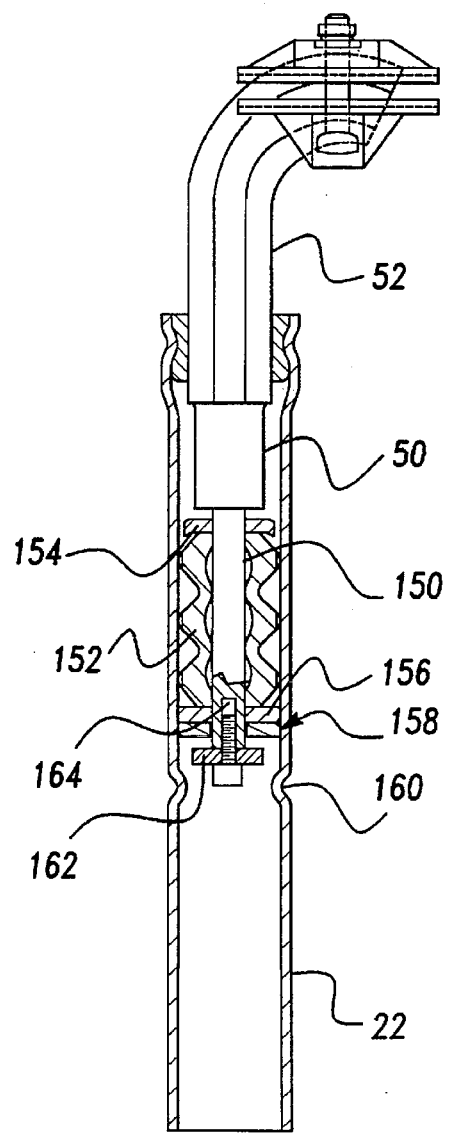
Fig-7
Fig-8

SEAT POST ASSEMBLY

BACKGROUND OF THE INVENTION

This invention relates to a seat post assembly for attaching a seat to a bicycle and isolating the rider from road shock forces exerted on the bicycle. More particularly, the invention is directed to a seat isolation device providing shock isolation through use of an elastomeric shock absorbing subassembly installed in the seat post. This arrangement isolates the seat and the cyclist from repetitive and random road shocks. Since the entire seat is deflected relative to the bicycle, no rigid or dramatic "bump" is experienced by the rider to cause discomfort.

While the invention is particularly directed to the art of bicycle seat post assemblies, and will be thus described with specific reference thereto, it will be appreciated that the invention may have usefulness in other fields and applications.

Traditional bicycle seats are attached to the bicycle with clamps that attach to two standard rails disposed under the seat. A wide variety of clamps are known, but most are characterized by a rigid connection between the bicycle frame and the seat. Accordingly, with the exception of the tires, there is no isolation between road shock and the seat.

Lack of isolation from road shock is a major difficulty for new cyclists, limiting enjoyment of cycling to their threshold of pain. Experienced riders, while more accustomed to the shock, nonetheless become fatigued more readily by the constant exposure to road shock.

Specialized seats have been developed that isolate shock. However, most cyclists prefer their own seat design. Further, existing seat designs have a rigid, pivoting front end that often is uncomfortable when the rear end of the seat deflects rapidly.

Additionally, shock absorbing seats using spring and shock absorber technology are known. However, these known seats require relatively heavy springs and shafts. The weight of a bicycle is increased with the addition of such springs and shafts. Significantly, in the cycling field, reduction of weight is important. Accordingly, these types of arrangements are not generally desired.

The present invention contemplates a new and improved seat post assembly which resolves the above-referenced difficulties and others.

SUMMARY OF THE INVENTION

A seat post assembly attaching a seat to a bicycle is provided. The assembly includes a shock absorbing subassembly attached to a curved bar which is received in a tube of the bicycle at one end and attaches to the seat at the other. The subassembly is retained on the inside of the tube and provides isolation of the rider from road shock.

In a further aspect of the invention, a bumper extends from the end of the curved bar and engages a disk disposed in the tube upon exertion of a force on the bar and the subassembly.

In a still further aspect of the invention, fluid chambers connected by a valve are included in the assembly so that fluid is transferred from one chamber to another to adjust the sensitivity of the assembly.

In a still further aspect of the invention, voids are formed in the subassembly.

In a still further aspect of the invention, an elastomeric compression spring is used.

One advantage of the present invention is that a cyclist is isolated from road shock.

Another advantage of the present invention is that the weight of the seat post assembly is not significantly affected by inclusion of the subassembly into the bicycle, thus providing significant riding advantages.

Further scope of the applicability of the present invention will become apparent from the detailed description provided below. It should be understood, however, that the detailed description and specific examples, while indicating preferred embodiments of the invention, are given by way of illustration only since various changes and modifications within the spirit and the scope of the invention will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

FIG. 5 is a still further embodiment of the present invention;

FIG. 6 is a still further embodiment of the present invention;

FIG. 7 is a still further embodiment of the present invention; and,

FIG. 8 is a still further embodiment of the present invention.

DETAILED DESCRIPTION OF THE PREFERRED EMBODIMENTS

Figure 1:
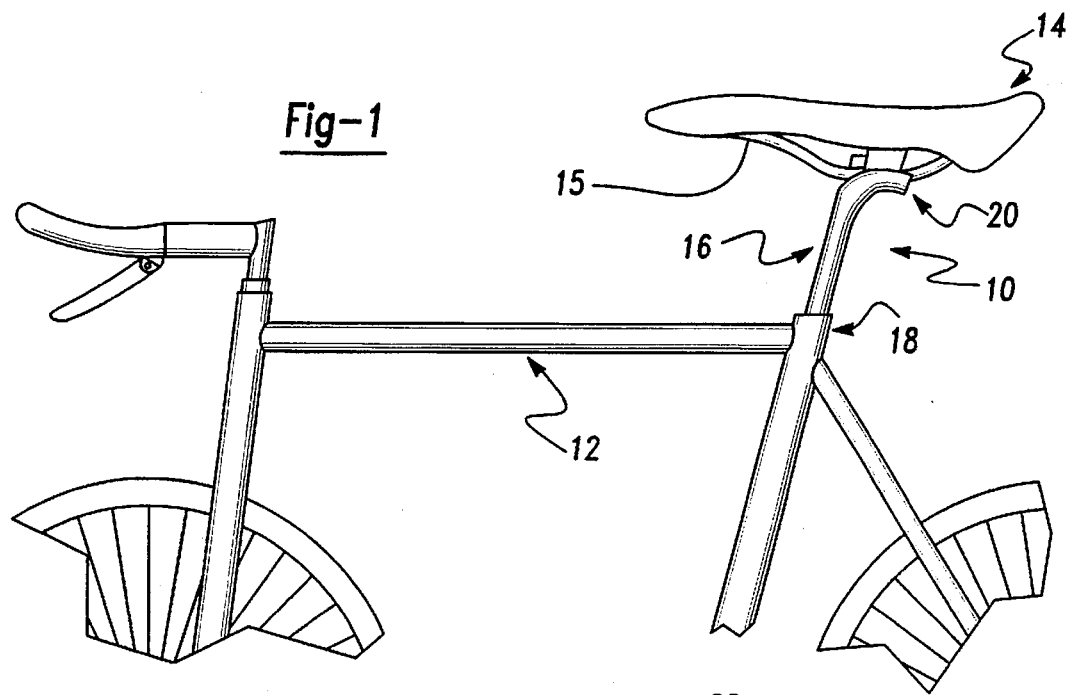
FIG. 1 is a view of the seat post assembly of the present invention incorporated into a bicycle.

Referring now to the drawings wherein the showings are for purposes of illustrating the preferred embodiments of the invention only and not for purposes of limiting same, FIG. 1 provides a view of the seat post assembly of the present invention incorporated into a bicycle. As shown, a bicycle 10 includes a frame 12 and a seat 14. The seat 14 is connected to the bicycle by way of seat post assembly 16 which is inserted into bicycle stem 18 of the frame 12. Additionally, seat post assembly 16 includes a seat attachment assembly 20 for connection of the seat therewith.

Figure 2:
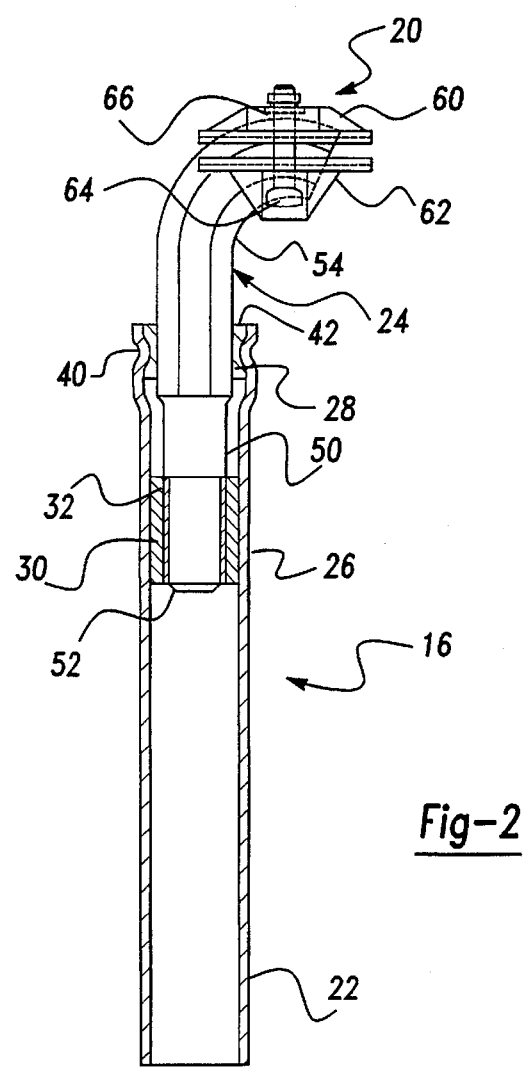
FIG. 2 is a side view of the seat post assembly of FIG. 1 with selected portions shown in cross-section.

Referring now to FIG. 2, the seat post assembly 16 further includes a main tube 22 into which a curved bar 24 is received. One end of the curved bar has a shock absorbing subassembly 26 disposed therearound. The subassembly 26 includes a circumferential elastomer bushing, or sleeve 30, having an aperture and an inner ring 32 disposed in the aperture of the elastomer sleeve 30. Spaced from the subassembly 26 is a guide 28.

The tube 22 has a crimp 40 circumferentially disposed on a receiving end 42. The crimp 40 retains the guide 28 inside the tube 22. The guide 28 conforms to the contour of the crimp 40.

The curved bar 24 includes a first generally round portion 50 having a reduced diameter end 52 and a second curved portion 54. The portion 54 has a hexagonal cross section and is curved to facilitate connection of the seat attachment assembly.

Figure 3:
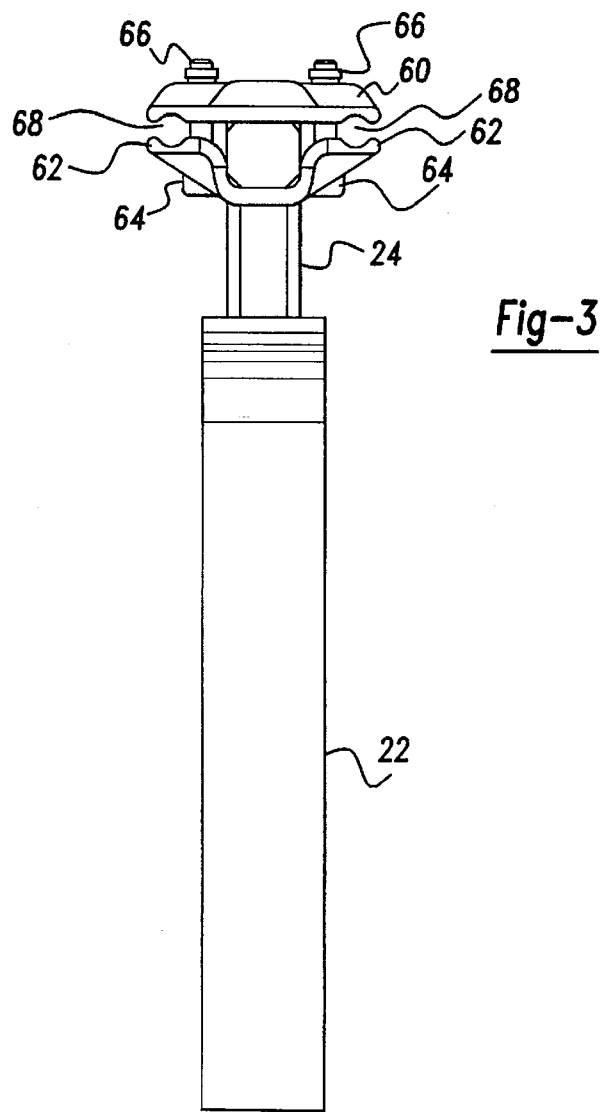
FIG. 3 is a back view of the seat post assembly of FIG. 1.

Referring now to both FIGS. 2 and 3, the seat attachment assembly includes an upper plate 60 and a lower plate 62 which cooperate to engage portion 54 of curved bar 24. Cap screws 64 and lock nuts 66 provide connection of the upper and lower plates 60, 62, to the curved bar 24. The upper and lower plates also have curved portions which, when the plates are suitably connected by the screws 64 and nuts 66, form eyelets 68 which function to support bicycle seat rails 15 (shown in FIG. 1).

The components of the assembly are preferably formed of light weight material. As a result, the weight of the seat post assembly of the present invention is only marginally higher than that of a conventional seat post. This is significant in that weight reduction is extremely important to cyclists.

The preferred materials of the various components are listed below. It is appreciated, however, that suitable alternative materials could be used to achieve the objectives of the invention.

| COMPONENT | PREFERRED MATERIAL |
| --- | --- |
| Upper Plate | Forged Aluminum AA 2014 (UNS 92014) |
| Lower Plate | Forged Aluminum AA 2014 (UNS 92014) |
| Screws | M5 × 0.8 6 g × 25 with coating |
| Nuts | Self locking PEM P/N LK-M5-2-EF or equivalent |
| Main Tube | Aluminum tube 6061 T6 |
| Guide | Dupont DELRIN material |
| Curved Bar | Aluminum bar 6061 T6 |
| Inner Ring | Aluminum tube 6061 T6 |
| Elastomer Bushing | SAEM4AA421A13B13F17 |
|  | SAEM4AA521A13B13F17 |
|  | SAEM4AA621A13B13F17 |

The different elastomer compounds listed represent different hardnesses of rubber, which change ride characteristics. Additionally, the listed materials may be used for components of the various embodiments hereafter described.

With respect to assembly, the inner ring 32 is inserted into and bonded to the elastomer bushing 30. The subassembly 26 is then pressed onto curved bar 24 and inserted into receiving end 42 of the tube 22 and bonded to the inner surface of the tube 22. The guide 28 may be inserted on the curved bar 24 either prior to insertion into the receiving end 42 or after such insertion. In this process, conventional bonding and press fitting techniques are used. The seat 14 can then be attached to the seat post assembly via connection of the seat rails between the upper and lower plates in the eyelets 68 of the seat attachment assembly 20.

In operation, the seat post assembly isolates forces caused by road shock from the cyclist. Such road shock forces and any forces caused by the rider result in tension forces exerted on the elastomer sleeve 30 which are absorbed by the elastomer subassembly 26. These tension forces in the elastomer sleeve exhibit themselves as a shear force with respect to the tube 22 and bar 24. Moreover, rotation of the curved bar within the inner tube is prevented by the hexagonal shape of the second portion 54 of the curved bar. The guide 28 has a corresponding hexagonal aperture, or merely conforms to the hexagonal shape, to receive the hexagonal shaped portion. Additionally, the natural spring rate and damping characteristics of the elastomer bushing 30 facilitate isolation of road noise, shock and vibration from the curved bar.

Figure 4:
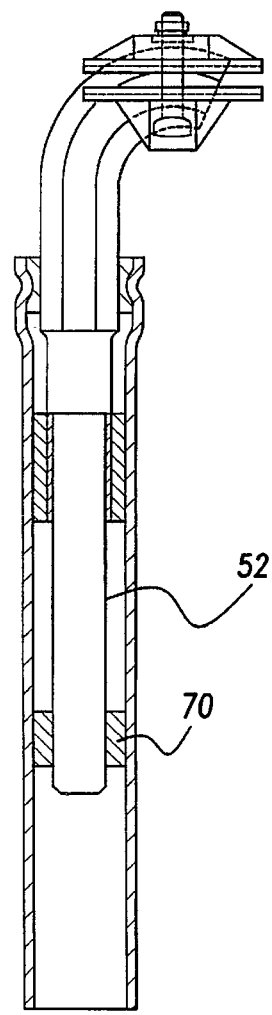
FIG. 4 is a further embodiment of the present invention.

Referring now to FIG. 4, a further embodiment of the present invention is illustrated. This embodiment is virtually identical to the first embodiment except that the reduced diameter end 52 of the curved bar is extended and provided with an additional guide 70. The guide 70 is disposed at the end of the curved bar 24. This guide provides a more stable ride. Additionally, the guide 70 could be positioned anywhere along the length of the curved bar, dependent on the desire of the user, which is received in the tube to improve stability.

FIG. 5 shows a still further embodiment of the present invention. As illustrated, an elastomer disk 80 is retained inside the tube 22 and positioned adjacent to a retaining disk 82. A crimp 84 is circumferentially disposed on the tube 22 to provide support for the retaining disk 82. The curved bar 24 has a bumper 86 secured to the reduced end 52 thereof. A screw 88 is threadingly received in a bore 90 of the curved bar to facilitate such securing. In this embodiment, the subassembly 26 and the elastomer disk 80 serve to reduce shock forces absorbed by the bicycle. Specifically, the subassembly 26 operates as referenced above and when particularly large forces are applied to the seat post assembly 16, the bumper 86 engages the elastomer disk 80. The bumper 86 can be adjusted via the threads of screw 88 to realize a spectrum of forces required to bring the elastomer into engagement with the elastomer disk.

With reference to FIG. 6, a still further embodiment of the present invention is shown. In this embodiment, the use of a fluid provides further damping of shock loads at different frequencies and loadings. Specifically, curved bar 24 is provided with a channel 100 which receives a valve stem 102 having a bore 104. A valve 106 having threads 108 is threadingly received into the bore 104. A radial bore 112 which intersects the channel 100 is also provided to the bar 24.

A first chamber 114 is defined by the reduced diameter end 52, subassembly 26, tube 22, and elastomer disk 116. Elastomer disk 116 is also provided with a backing plate 118 which engages a circumferential crimp 120 of the tube 22.

A second chamber 122 is defined by the subassembly 26, the inner tube 22, bar 24, and a seal ring 124. The seal ring 124 engages a rib 126 of guide 28.

Fluid passage 128 is positioned within the subassembly 26 to connect with the first chamber 114. Likewise, fluid passage 130 is disposed in subassembly 26 to connect to the second chamber 122.

The stem 102 is inserted into the channel 100. The stem 102 controls the pressure at which the valve 106 releases fluid. Under given loads, the valve 106 permits fluid to flow from chamber 114 to chamber 122. However, at other loads, the valve will not open and the fluid is forced to flow through fluid passages 128 or 130. The relationship of the valve setting and the design of the flow orifices, which facilitate the selective flow of fluid between chambers and/or passages, permit the user to isolate and damp specific forces and frequencies of vibration in addition to utilizing the shock absorbing characteristic of the subassembly 16 previously described.

The fluid itself is engineered to particular viscosity and frictional responses, and could be oil, glycerol, electroreological fluid, magnetoreological fluid, or a variety of others. In the case of magnetoreological and electroreological fluids, the control mechanism is an electromagnet rather than a mechanical valve.

A still further embodiment of the present invention is illustrated in FIG. 7. More specifically, this embodiment is similar to the second embodiment in that the first portion 50 of the curved bar is extended. However, the subassembly 26 includes voids 140 circumferentially disposed about the subassembly 26. The subassembly 26 is retained in the tube by circumferential crimps 142 and 144.

The voids 140 may be filled with a variety of fluids to change the ride and damping characteristics of the assembly. This fluid could be of any type and preferably of the type described with reference to the previous embodiment.

Referring now to FIG. 8, a seat post assembly utilizing compression loading rather than tension and/or shear loading is illustrated. A reduced diameter end 150 of the first portion 50 of the curved bar 22 has an elastomer 152 disposed therearound. This elastomer is preferably a compression spring-type elastomer that is confined by a washer 154 and a washer, or collar, 156. The collar 156 is secured inside the tube 22 by the engagement of a spacer 158 against a circumferential crimp 160. The washer 156 and the spacer 158 have corresponding apertures bored therethrough to receive the reduced diameter end 150. An adjusting knob 162, having a diameter greater than that of the apertures of the spacer and washer 158, 156, is threadingly received in a bore 164 of the reduced diameter end 150. The elastomer 152 can be preloaded by adjusting the knob 162. Preloading can change the ride characteristics of the assembly.

The above description merely provides a disclosure of particular embodiments of the invention and is not intended for the purpose of limiting the same thereto. As such, the invention is not related to only the above described embodiments. Rather, it is recognized that one skilled in the art could conceive alternative embodiments that fall within the scope of the invention.

Having thus described the invention, We claim:

1. A seat post assembly for attaching a seat to a bicycle, absorbing forces exerted on the bicycle and isolating a rider from road shock, the assembly comprising:

a tube adapted to be inserted into a stem of the bicycle, the tube having an inner cylindrical surface and a receiving end;

a curved bar having a first end received in the receiving end of the tube, and extending into the tube a predetermined distance, and a second end adapted to have the seat attached thereto;

a subassembly disposed at the first end of the bar, the subassembly having an inner ring surrounding the first end and an outer elastomer sleeve bonded to the inner ring and retained on the inner surface of the tube, the road shock causing forces to be exerted on the subassembly that are absorbed by the subassembly whereby the rider is isolated from the road shock; and, a guide spaced from the subassembly on the bar and positioned in the receiving end of the tube.

2. The assembly as set forth in claim 1 wherein the receiving end of the tube is crimped.

3. The assembly as set forth in claim 2 wherein the guide has a surface conforming to the crimped receiving end.

4. The assembly as set forth in claim 1 wherein the bar has a hexagonal shape in selected portions to prevent rotation of the bar within the tube.

5. The assembly as set forth in claim 4 wherein the guide has an inner surface periphery conforming to the hexagonal selected portions of the bar.

6. The assembly as set forth in claim 1 wherein the second end of the bar has a lower plate and an upper plate attached thereto to support the seat.

7. The assembly as set forth in claim 1 further comprising a second guide.

8. The assembly as set forth in claim 1 further comprising a disk disposed in the tube a second predetermined distance from the receiving end, the second predetermined distance being greater than the first predetermined distance.

9. The assembly as set forth in claim 8 further comprising a bumper extending from the first end of the bar, the bumper engaging the disk upon exertion of a force on the bar and subassembly.

10. The assembly as set forth in claim 8 further comprising:

a first fluid chamber between the subassembly and the disk;

a second fluid chamber between the guide and the subassembly;

a channel extending through the subassembly connecting the first and second chambers; and, a valve in the channel to selectively allow fluid transfer between the first and second chambers.

11. The assembly as set forth in claim 1 wherein the subassembly is retained between circumferential crimps on the inner surface of the tube and further wherein the elastomer outer ring comprises voids forming fluid chambers between the subassembly and the inner surface of the tube.

* * * * *